Figure 1:
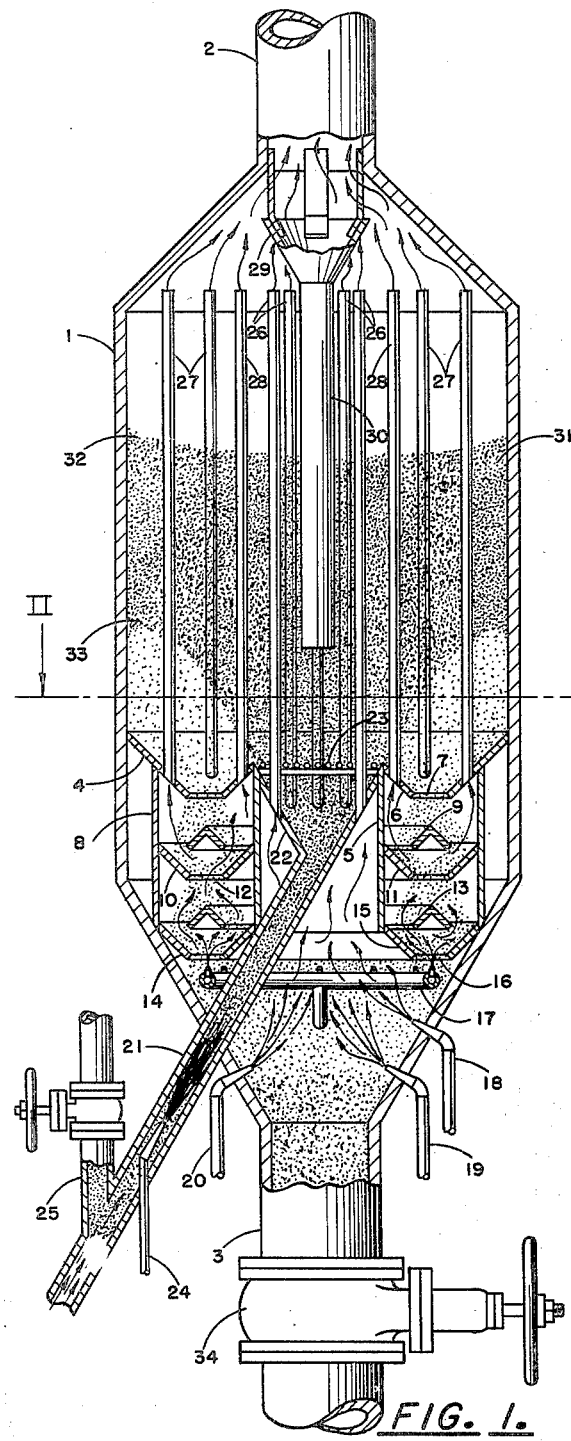
Figure 2:
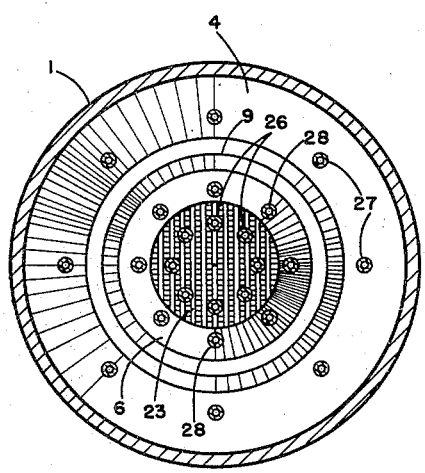

Feb. 7, 1950  N. P. PEET  2,496,356
CATALYTIC APPARATUS
Filed May 13, 1944

Nick P. Peet INVENTOR.

BY P. J. Whelan
ATTORNEY.

Patented Feb. 7, 1950

2,496,356

UNITED STATES PATENT OFFICE 2,496,356

CATALYTIC APPARATUS

Nick P. Peet, Baytown, Tex., assignor to Standard Oil Development Company, a corporation of Delaware Application May 13, 1944, Serial No. 535,433

3 Claims. (Cl. 23—288)

The present invention is directed to apparatus for carrying out catalytic reactions with a finely divided catalyst which is held in suspension in the reaction materials. It has particular application to catalytic cracking.

In the art of catalytic cracking, there has been developed a method which is commonly referred to as the fluid catalyst method in which finely divided catalyst is carried through the reaction chamber in suspension in the hydrocarbons to be cracked. Conventionally, this is an upflow method in which the hydrocarbons and catalyst are introduced into the bottom of the reactor, pass upwardly therethrough and are discharged into separation equipment in which the catalyst is separated from the reacted vapor and returned to the reactor sometimes after regeneration. In a modification of this conventional procedure, the reaction and separation, as well as partial regeneration, occur in a single reaction vessel. In this modification the catalyst in suspension in the hydrocarbons is introduced into the bottom of the vessel substantially at its center and a velocity of flow is employed which imparts a motion to the catalyst particles as a whole which simulates a fountain effect, that is, the catalyst moves upwardly through the center of the reactor and arcs back in the annular space between the center and the wall of the vessel. On its return travel, the catalyst is subjected to a stripping medium, such as steam, to remove hydrocarbons therefrom. It is to this particular mode of operation that the present invention has special application.

When operating according to the procedure last described, there is created in the reactor a dense zone in which the catalyst particles are most highly concentrated. The velocity of the reactants is regulated so as to maintain the catalyst particles in this dense zone as long as possible. It is customary to introduce the hydrocarbons to be cracked in the form of a fog or mist which is heated to reaction temperature and also to simultaneously inject a quantity of superheated steam in order to assist in the vaporization of the hydrocarbons and in their distribution throughout the catalyst mass. At the same time, the stripping medium which is passed countercurrent to the catalyst on its downward flow also passes through this dense zone. The velocity of flow of this stripping medium necessarily imposes a limit on the amount and velocity of flow of the hydrocarbon feed since a combination of these velocities of flow must be such that the bulk of the catalyst will not be carried off overhead.

The principal object of the present invention is to eliminate in a procedure of the type just described the suspending effect of the stripping medium whereby the amount of hydrocarbons or other reacting material fed through the vessel can be substantially increased with a resulting increase in the conversion capacity of the unit. Further objects and advantages of the present invention will appear from the following detailed description of the accompanying drawing in which Figure I is a front elevation, partly in section, of an apparatus embodying the principle of operation of the present invention, and Figure II is a cross section along the line II—II of Figure I.

Referring to the drawing in detail, numeral 1 designates a reactor having a central outlet 2 at its upper end and a central outlet 3 at its lower end. In the lower part of said apparatus is mounted a unit which comprises the feed and catalyst inlet and the catalyst stripping section. This unit has an upper skirt 4 welded to the wall of the reactor and extending downwardly and inwardly toward central cylindrical member 5. Mounted on the upper end of 5 is a skirt 6 extending downwardly and outwardly and having its outer edge spaced from the inner edge of skirt 4 and in the same plane therewith to form an annular opening 7. Connected to the underside of skirt 4 is a cylindrical member 8, having its wall parallel to the wall of member 5 and the wall of member 1, and spaced from the latter, being welded to the skirt 4 and also, if desired, to the wall of the reactor 1 in the lower conical portion of the latter.

Mounted beneath the opening 7 and/or connected to elements 8, in any suitable manner, is a doughnut 9 of the conventional type used in fractionating equipment with its apex substantially centered with the opening 7, and with its wings having a greater spread than the width of opening 7.

Again below doughnut 9 are a pair of complementing skirts 10 and 11 welded to means 8 and 5, respectively, having their free ends in the same plane and spaced from each other to form an annular opening 12, beneath which is another doughnut 13 which, in turn, underlies a third pair of complementing skirts 14 and 15 welded to members 8 and 5, respectively, and having their free ends in the same plane and spaced to form an opening 16. Beneath this latter opening is a ring nozzle 17 adapted to eject steam or other stripping medium through the opening 16.

Further steam nozzles, such as 18, 19 and 20, are provided in the lower conical portion of reactor 1 beneath the stripping unit.

A pipe 21 projects through the lower conical portion of the reactor 1 into the cylindrical member 5 where it terminates in a funnel 22 welded or otherwise connected to the upper edge of member 5. The open mouth of this funnel is covered with a grid 23, the purpose of which is to assist in uniformly distributing the reaction material of the catalyst. The oil to be cracked or other reacting material, as the case may be, is injected into pipe 21 by an injection nozzle 24. There is also introduced into pipe 21, through pipe 25 which is connected to a suitable hopper, not shown, finely divided catalytic material which is forced upwardly through pipe 21 by steam or other medium introduced into pipe 21 at a lower point. If desired, the reacting material itself may be introduced into pipe 21 at a point farther removed from the reactor than pipe 25.

Mounted in the funnel member 22 are a series of upstanding pipes 26 which extend to the upper end of the reactor above the dense zone of the catalyst and which pass through the wall of the funnel so as to be capable of conducting fluid from below the funnel to the upper end of the reactor. Similarly, a series of spaced upstanding pipes 27 are mounted in the skirt 4 and extend above the dense zone of the catalyst in such a way as to conduct fluid from beneath skirt 4 to the upper end of the reactor. Likewise, skirt 6 is provided with a series of spaced upstanding pipes 28 for conducting fluid from beneath skirt 6 to the upper end of the reactor.

Fixed in the outlet 2 at the upper end of the reactor is an arrangement shown as a funnel 29, having its mouth facing the outlet 2 and its stem 30 hanging down in the center of the reactor to a point intermediate to the ends thereof and above the grid 23. This simple arrangement is intended to represent a cyclone separator which is mounted in the upper end of the reactor for the separation from the reacted material of any catalyst which might be carried through the reactor. This catalyst is returned to the reactor preferably to a point below the dense zone.

In the use of this apparatus in the particular application of oil cracking, the oil mixed with finely divided catalyst and steam in the form of a suspension or dense fog is passed into the reactor through pipe 21 and through the grid 23, following a path somewhat as indicated in the drawing in which the catalyst particles are designated by numeral 31. It will be seen that substantially between the points 32 and 33 in the reactor the catalyst is in the dense phase. The catalyst from this phase drops down along the outer annular zone of the reactor into the stripping equipment where it is met by a rising current of superheated steam. The bulk of the steam introduced through the ring nozzle 17 leaves the stripping zone through the pipes 27 and 28, since this affords the path of least resistance. Likewise, the bulk of the steam introduced through lines 18, 19 and 20 which is also used for further stripping of the catalyst, passes to the upper end of the reactor through the tubes 26. Thus the velocity and quantity of the stripping steam may be adjusted independently of the feed rate of the reacting materials, since this stripping steam or other stripping medium exerts no substantial influence on the path of travel of the catalyst in the reactor. Consequently, this permits a considerably larger quantity of reactive material to be introduced through tube 21, since it must be introduced in such an amount and at such a velocity as to establish a dense phase of substantial proportions and maintain it.

The catalyst after being stripped leaves the vessel through outlet 3 which is provided with a valve 34.

The present invention is not in any way concerned with the conditions of operation of catalytic cracking or any other catalytic process of the general character referred to above. It deals rather with a method and apparatus which permits an effective stripping of the catalyst in such an operation without introducing a limiting factor in the rate of flow of the reacting materials and the conversion capacity of the reaction. It will be apparent that in the realization of this objective, it is not necessary that the precise apparatus of the procedure described be followed. For example, it is not necessary that the tubes for conducting away the stripping medium pass upwardly through the catalytic zone. They can be arranged so as to by-pass the catalytic zone entirely as, for example, by being connected to discharge through the side of the reactor at a point just above the stripping section. The arrangement shown, however, is preferred since it affords, in a simple way, the recombination of the oil vapors recovered from the catalyst with the reaction vapors leaving the reactor.

The nature and objects of the present invention having been thus described and illustrated, what is claimed as new and useful and is desired to be secured by Letters Patent is:

1. A catalytic reactor comprising a vessel, a tray attached to the walls at an intermediate point in said vessel so as to divide the vessel into upper and lower compartments, said tray having an opening in the center thereof and an annular opening arranged concentrically between said central opening and the walls of said vessel to permit the passage of material from the upper compartment to the lower compartment, a conduit sealing off said central opening and arranged to discharge into said vessel above said tray, upstanding open ended pipes attached to said tray and arranged to pass fluid from the under side thereof to the upper end of said vessel, inlets for fluid in the lower end of said vessel below said tray, baffle means between said tray and said inlets for directing fluid into the lower ends of said pipes, a catalyst outlet at the bottom of said vessel, and a product outlet at the upper end of said vessel.

2. A catalytic reactor comprising a vessel, an open ended conduit projecting upwardly from the lower end of said vessel into its interior to a point intermediate its ends adapted to deliver into said vessel catalyst particles and reactants, an annular skirt attached to the end of said conduit and to the wall of the vessel so as to form two compartments therein, said skirt having a cross section in the form of a V with its bottom cut off to form an opening to permit passage of solid material from the upper part of said vessel to its bottom, inlets for fluid arranged on said vessel below said skirt, open ended pipes mounted on the inclined walls of said skirt and extending from the underside of said skirt to a point in the upper end of said vessel, baffle means between said fluid inlets and said skirt adapted to direct fluid from said inlets to the lower ends of said pipes, a product outlet at the upper end of said vessel and a catalyst outlet at the bottom of said vessel.

3. A catalytic reactor comprising a vertical vessel, an inlet line arranged at an intermediate point in said vessel, an outlet in the top of said vessel adapted to remove product therefrom, a partition member attached to the walls of said vessel defining an upper and a lower compartment and having an open annulus communicating said upper compartment with said lower compartment, said inlet line defining an opening in said partition member adapted to discharge catalyst and reactants into said upper compartment of said vessel, a plurality of vertical conduits attached to said partition member and adapted to discharge fluid from said lower compartment to an upper portion of said upper compartment, baffle members arranged below said annulus adapted to scatter catalyst passing therethrough, conduits arranged below said baffle members adapted to discharge fluid into said lower compartment, and a catalyst outlet arranged in the bottom of said vessel adapted to remove catalyst from the bottom of said lower compartment.

NICK P. PEET.

REFERENCES CITED

The following references are of record in the file of this patent:

UNITED STATES PATENTS

| Number | Name | Date |
|---|---|---|
| 2,304,128 | Thomas | Dec. 8, 1942 |
| 2,327,175 | Conn | Aug. 17, 1943 |
| 2,337,684 | Scheineman | Dec. 28, 1943 |
| 2,363,874 | Krebs | Nov. 28, 1944 |
| 2,367,281 | Johnson | Jan. 16, 1945 |
| 2,367,694 | Snuggs | Jan. 23, 1945 |
| 2,422,793 | McAfee | June 24, 1947 |
| 2,429,721 | Jahnig | Oct. 28, 1947 |
| 2,443,854 | Ferguson | June 22, 1948 |

FOREIGN PATENTS

| Number | Country | Date |
|---|---|---|
| 118,399 | Australia | Apr. 12, 1944 |